No. 764,883. Patented July 12, 1904.

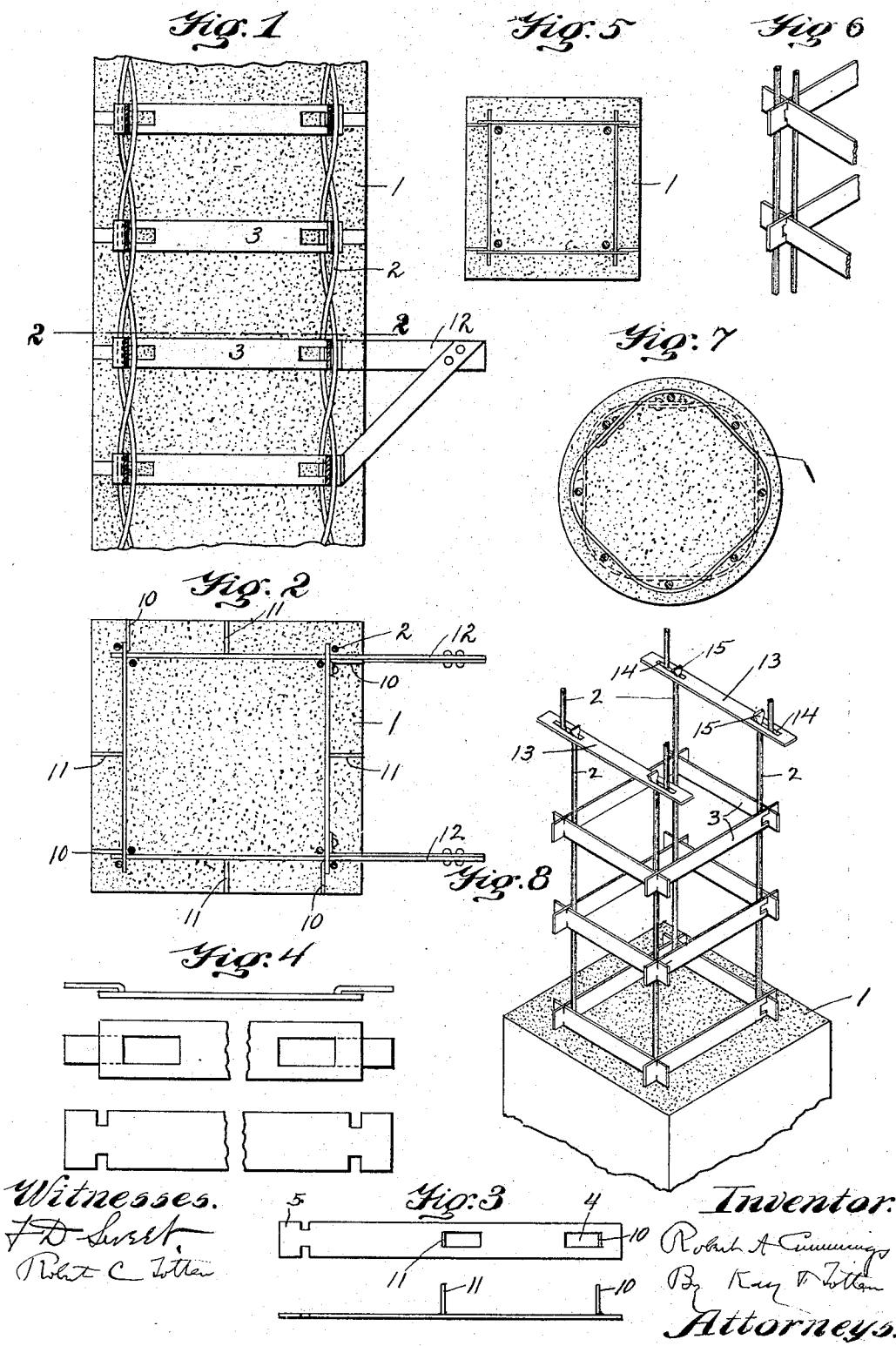

UNITED STATES PATENT OFFICE.

ROBERT A. CUMMINGS, OF BEAVER, PENNSYLVANIA.

METAL-AND-CONCRETE COLUMN.

SPECIFICATION forming part of Letters Patent No. 764,883, dated July 12, 1904.

Application filed March 4, 1903. Serial No. 146,161. (No model.)

*To all whom it may concern:*

Be it known that I, ROBERT A. CUMMINGS, a resident of Beaver, in the county of Beaver and State of Pennsylvania, have invented a new and useful Improvement in Metal-and-Concrete Columns; and I do hereby declare the following to be a full, clear, and exact description thereof.

My invention relates to concrete columns, piles, struts, and the like used in building structures, such as bridges, viaducts, docks, fireproof buildings, and other structures.

The object of my invention is to provide a column, pile, or strut for this purpose which is composed mainly of concrete and which will carry a much greater load than those heretofore constructed.

Concrete and cement, as is well known, possess great compressive strength when properly constructed and supported, and they also are not affected by fire, water, or other elements, and for these reasons are highly desirable in many building constructions. Attempt has heretofore been made to utilize the same for columns, piles, or struts, and with some degree of success. It has been found, however, that when subjected to very heavy loads such columns fracture upon conical lines, the apices of the cones being substantially at the center of the column. This fracture is, I believe, due to the slight tensile strength of the concrete, so that it is forced apart laterally by excessive stresses applied vertically thereto.

The object of my invention is to overcome this difficulty and to provide columns and the like made largely of concrete and wherein the liability to lateral spreading or fracture is entirely or largely overcome, thus enabling the column to carry a much heavier load than would otherwise be the case.

To this end my invention consists, generally stated, in embedding in the concrete column a series of metallic straps, bands, or strips, which encircle a considerable portion of the body of the concrete, and thus prevent it from spreading or fracturing laterally. Preferably these bands or strips will be used in connection with vertical tie-rods such as have heretofore been embedded in concrete columns, and the bands will also preferably be formed of strips united at their corners by slotted connections, which will permit of their ready assembling when building up the column. My invention also comprises certain details of construction hereinafter described and claimed.

In the accompanying drawings, Figure 1 is a vertical section through the preferred form of my column. Fig. 2 is a horizontal section therethrough. Fig. 3 shows the details of construction of the bands or strips. Fig. 4 shows a modification of such bands. Fig. 5 is a horizontal section of a modified form of column. Fig. 6 is a view of the metal parts of still another modification. Fig. 7 is a horizontal section showing the idea applied to a round column, and Fig. 8 illustrates the manner of building columns in sections.

The essential idea underlying my invention consists in providing suitable means, preferably metallic, and embedded in the concrete column, pile, or the like and which encompasses or encircles all or a greater portion of the body of the concrete and prevents the same from spreading or fracturing laterally. This idea may be embodied in a large variety of specific constructions, and in the drawings I have shown the same adapted to a column having therein vertical rods, such as are now placed in concrete columns.

In the drawings the concrete is shown at 1 and the vertical rods at 2. The latter may be of various numbers and differently located, depending upon the size and shape of the column. In my preferred construction, however, I arrange these rods in pairs, as shown in Figs. 1 and 2, and with a square column, such as shown, a pair of rods will be located in each corner of the column, inside the outer face thereof, so that said rods will be entirely embedded or enveloped by the concrete, and thus protected from the elements.

At suitable intervals in the column are embedded strips or bands 3 of metal of suitable thickness and width and which act to prevent the concrete from spreading laterally. These strips or bands may be unattached to the rods 2 or may be united thereto in any suitable way. I prefer to unite the strips themselves one to the other, so as to form practically a continuous band enveloping or surrounding the major portion of the body of the concrete. This can be conveniently accomplished by providing said strips at their meeting ends with suitable interlocking means—such, for instance, as providing one of the meeting ends with a slot 4 and providing the other meeting end with a head or enlargement 5, which latter is oblong or flat, as shown, and which can be passed through the slot 4, and then by giving the member on which it is formed a quarter-turn it will be locked in said slot, as will be readily understood. Any other convenient means, however, for uniting the ends of the strips may be employed—such, for instance, as rivets or any of the numerous interlocking means now well known in bale-ties and the like. In any event, however, the united strips will form practically a continuous band, and, if desired, a single band might accomplish the same purpose, said band having its ends suitably secured together. In the construction of round columns, such as shown in Fig. 7, the latter construction may be and preferably will be followed; but with rectangular or other polygonal shapes of columns I prefer to form the bands by uniting together a series of strips, one of which forms a side of the polygon. These strips or bands will be located in fairly close proximity one above the other and will be of such width that a substantial portion of the height of the column is surrounded by these bands. When the rods 2 are used, the bands may be secured to said rods in a variety of ways, and in the preferred form of my construction, wherein the rods 2 are arranged in pairs, the bands can be secured to the rods conveniently in the manner illustrated in Fig. 1—that is, by causing the rods to pass alternately inside and outside of the bands, as indicated—thus securing the bands in loops formed by the two rods. In this manner both rods will be held against lateral deflection by the bands, and it is possible to space the bands any desired distance apart by merely driving them down closer one with reference to the other. This arrangement also permits the position of the bands to be adjusted vertically when putting them in place.

With a column such as shown in Fig. 5, wherein a single rod only is used at each corner of the column, the bands 3 preferably will be placed outside of the rods, as shown, so as to hold the latter against outward deflection. If preferred, two rods may be used in each corner, one inside and the other outside of the bands, as shown in Fig. 6. In this case, however, the rods are not passed alternately inside and outside of the bands, as in Fig. 1. With round columns, as shown in Fig. 7, the bands preferably will be interwoven with the rods alternately inside and outside the same; but this is not necessary, as they may pass outside of all of the rods.

In building up columns according to my invention the rods 2 may or may not be employed. When such rods are used, they will be placed in vertical position and the bands 3 will be assembled therewith in any of the ways above described. A suitable mold, of wood or the like, is then built around the column, and the concrete is filled in and packed tight. The bands or strips 3 can be built up as the work proceeds, so that, in effect, the column will be built section by section, which is the most convenient way of doing the work. During the filling-up process it is necessary to hold the metal portions—that is, the rods 2 and strips 3—in proper position with reference to the center of the column. My manner of uniting the strips 3 to each other provides a convenient way of accomplishing this result. In forming the slots 4 the metal is punched out, but left attached at one end, and this punched-out portion will be bent outwardly, as indicated in Fig. 2, and provides a projection 10, which rests against the wooden mold surrounding the column, thus holding the metal structure in proper position with reference to the axis of the column. If desired, similar tongues may be punched out of the strips intermediate their ends, as shown at 11, Fig. 2. In filling the concrete in between and around the metal parts the latter are entirely embedded or enveloped in the concrete, thus protecting the metal from the action of the elements. The bands, however, encircle the major portion of the body of the concrete and prevent the same from spreading laterally, thus enabling the entire compressive strength of the concrete to be utilized in carrying the load.

In case the column is to be provided with a bracket or the like it will only be necessary to extend one or more of the strips 3 outwardly beyond the surface of the concrete of the column, as indicated at 12, Fig. 2, this projecting portion or portions serving as the horizontal part of the bracket.

By my invention it is possible to construct the columns in sections, this being illustrated in Fig. 8. Each of the sections is constructed practically in the way above described, composed of the concrete 1, vertical rods 2, and strips or bands 3. In addition to the latter each column-section will be provided at or near its end with plates or strips 13, which will be suitably united to the rods 2 of the section and which preferably will be provided with slots 14 for receiving projecting enlarged heads or ends 15 of the rods 2 of the next adjacent section. In constructing the columns in this manner the first section is built up in the ordinary way and at the top will be provided with the plates 13. The rods 2 of the next adjacent section are then passed through the slots in the plates 13 and given a quarter-turn, thus locking them in place, and these rods are in turn connected by the strips or bands 3 and enveloped with concrete in the ordinary way. In this manner a column of any desired height can be easily constructed. When my invention is applied to piles, the latter will have a tube or tubes embedded therein to serve in sinking the piles and to permit the formation of a base thereunder by forcing concrete or cement down through the tubes.

Various modifications of the details of construction above described may be made without departing from the spirit of my invention, and I wish it understood that the claims are not limited to the precise details shown.

The strips or bands described practically form a skeleton envelop or casing for the concrete and prevent it from spreading laterally, thus preventing the fracture of the concrete on the conical lines, as heretofore, and greatly strengthening the same. The vertical rods 2 take care of the bending moment and are therefore desirable; but they are not absolutely necessary.

What I claim as my invention, and desire to secure by Letters Patent, is—

1. A column, pile, or the like, comprising a series of flat metallic strips provided with interlocking end portions and united thereby to form continuous bands, and concrete or the like enveloping and embedding said bands.

2. A column, pile or the like, comprising a series of metallic rods extending longitudinally of the column, a series of metallic strips having their meeting ends provided the one with a slot and the other with a head or enlargement whereby the same may be locked together to form a continuous band, and concrete or the like enveloping and embedding said bands and rods.

3. A column, pile or the like, comprising a series of metallic strips having their meeting ends the one provided with a head or enlargement and the other with a slot whereby the same may be united to form a continuous band, the metal punched out to form the slots being bent outwardly to form a tongue or projection for contacting with the mold, and concrete or the like enveloping and embedding said bands.

4. A column, pile or the like, comprising a series of metallic rods extending longitudinally of the column, a series of metallic strips connecting said rods, slots formed in said bands and having the punched-out portion bent outwardly to form projections to contact with the mold, and concrete or the like enveloping and embedding said strips and rods.

5. A column, pile, or the like, comprising a series of metallic strips or bands running transversely of the column, a series of rods extending longitudinally of the column and arranged in pairs, the rods of each pair passing alternately inside and outside of the bands, and concrete or the like embedding and enveloping said rods and bands.

6. A column, pile, or the like, comprising a series of metallic strips running transversely of the column and provided with interlocking end portions and united thereby to form continuous bands, a series of rods extending longitudinally of the column and arranged in pairs, the rods of each pair passing alternately inside and outside of the bands, and concrete or the like embedding and enveloping said bands and rods.

7. A column, pile, or the like, comprising a series of metallic rods extending longitudinally of the column, a series of metallic strips uniting said rods, and concrete or the like enveloping and embedding said strips and rods, one or more of said strips projecting laterally beyond said concrete to form a bracket.

8. A concrete-column section having longitudinal rods embedded therein and having plates secured to said rods at their ends, said rods projecting beyond the plates and provided with enlargements or heads, and said plates being provided with slots for receiving the ends of the rods of an adjacent section and locking the same thereto.

In testimony whereof I, the said ROBERT A. CUMMINGS, have hereunto set my hand.

ROBERT A. CUMMINGS.

Witnesses:
ROBERT C. TOTTEN,
G. KREMER.